(12) United States Patent
Varnon et al.

(10) Patent No.: US 6,902,246 B2
(45) Date of Patent: Jun. 7, 2005

(54) QUANTIZED FEED SYSTEM FOR SOLID FREEFORM FABRICATION

(75) Inventors: David Montgomery Varnon, Canyon Country, CA (US); Jon Jody Fong, Calabasas, CA (US); Raymond J. Bishop, Santa Clarita, CA (US)

(73) Assignee: 3D Systems, Inc., Valencia, CA (US)

( * ) Notice: Subject to any disclaimer, the term of this patent is extended or adjusted under 35 U.S.C. 154(b) by 480 days.

(21) Appl. No.: 09/970,956

(22) Filed: Oct. 3, 2001

(65) Prior Publication Data

US 2003/0063138 A1 Apr. 3, 2003

(51) Int. Cl.[7] ............................... B41J 2/01; B41J 3/00
(52) U.S. Cl. .................................... 347/1; 347/2
(58) Field of Search ........................... 347/1, 2, 19, 4, 347/14, 36, 86, 35, 23, 88, 87, 89

(56) References Cited

U.S. PATENT DOCUMENTS

| | | | |
|---|---|---|---|
| 4,593,292 A | 6/1986 | Lewis | 347/7 |
| 4,609,924 A | 9/1986 | De Young | 347/88 |
| 4,631,557 A | 12/1986 | Cooke et al. | 347/88 |
| 4,636,803 A | 1/1987 | Mikalsen | 347/88 |
| 4,682,185 A | 7/1987 | Martner | 347/88 |
| 5,280,300 A | 1/1994 | Fong et al. | 347/87 |
| 5,555,176 A | 9/1996 | Menhennett et al. | 700/118 |
| 5,784,279 A | * 7/1998 | Barlage et al. | 700/119 |
| 6,170,942 B1 | * 1/2001 | Ogawa et al. | 347/88 |

* cited by examiner

*Primary Examiner*—Stephen Meier
*Assistant Examiner*—Charles Stewart, Jr.
(74) *Attorney, Agent, or Firm*—Ralph D'Alessandro

(57) ABSTRACT

A material feed system for solid freeform fabrication. The build material is delivered in discrete or quantized amounts by the feed system in a non-flowable state to the dispensing device and the material is then changed to a flowable state prior to being dispensed. The feed system can be used to build three-dimensional objects in color, if desired. In one embodiment individual cartridges with build material are loaded into a magazine on the feed system which is integrated with a waste removal system. As the build material is expelled from the cartridges, waste material is deposited into the cartridge. Once all the build material has been expelled, the waste material is hermetically sealed in the spent cartridge which is then ejected from the system. The hermetically sealed cartridges protect operators from contact with the reactive waste material making the system safe for the office environment.

52 Claims, 6 Drawing Sheets

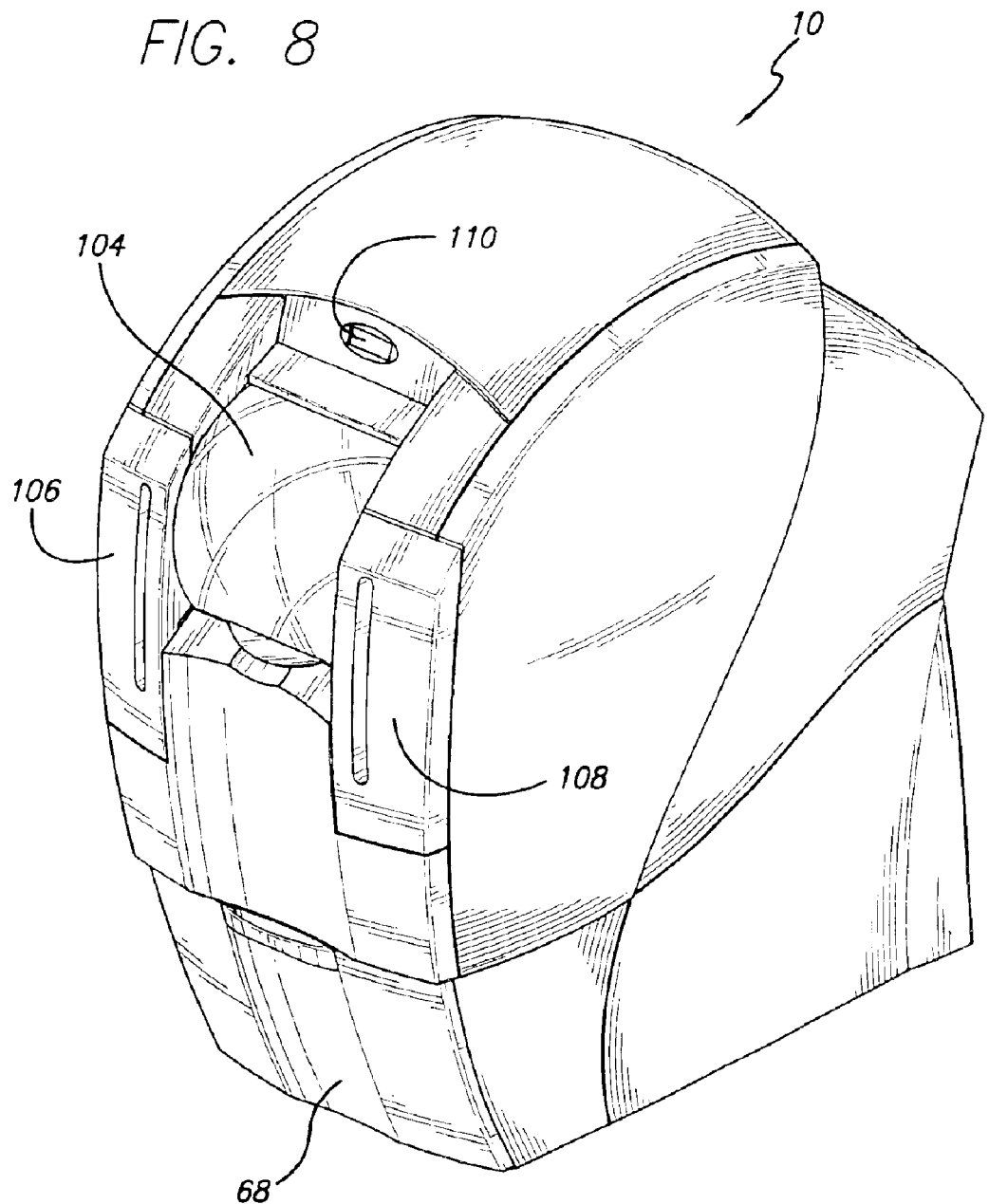

QUANTIZED FEED SYSTEM FOR SOLID FREEFORM FABRICATION

BACKGROUND OF THE INVENTION

1. Field of the Invention

The invention relates in general to a material feed system for solid freeform fabrication and, in particular, to a quantized feed system that can selectively feed discrete portions of material directly to a solid freeform fabrication device to build three-dimensional objects. Because the feed system is quantized, the system can be used to build three-dimensional objects in color or to dispense more than one material. In addition, the feed system can be integrated with a hermetically sealed waste removal system wherein reactive materials can be handled without special handling procedures.

2. Description of the Prior Art

Recently, several new technologies have been developed for the rapid creation of models, prototypes, and parts for limited run manufacturing. These new technologies can generally be described as solid freeform fabrication, herein referred to as "SFF". Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. In SFF, complex parts are produced from a modeling material in an additive fashion as opposed to conventional fabrication techniques, which are generally subtractive in nature. For example, in conventional fabrication techniques material is removed by machining operations or shaped in a die or mold to near net shape and then trimmed. In contrast, additive fabrication techniques incrementally add portions of a build material to targeted locations, typically layer by layer, in order to build a complex part.

SFF technologies typically utilize a computer graphic representation of a part and a supply of a build material to fabricate the part in successive layers. SFF technologies have many advantages over the prior conventional manufacturing methods. For instance, SFF technologies dramatically shorten the time to develop prototype parts and can quickly produce limited numbers of parts in rapid manufacturing processes. They also eliminate the need for complex tooling and machining associated with the prior conventional manufacturing methods, particularly when creating molds for casting operations. In addition, SFF technologies are advantageous because customized objects can be produced quickly by processing computer graphic data.

There are a wide variety of build materials that are used in various SFF techniques. These materials are typically applied in the form of a powder, liquid, gas, paste, foam, or gel. Recently, there has developed an interest in utilizing highly viscous paste materials in SFF processes to achieve greater mechanical properties. In addition, an interest has recently developed in reproducing visual features such as color on the three-dimensional objects produced by SFF processes. This has produced a need to develop special additives for the build materials along with new dispensing systems to enable the production of these visual features when building the three-dimensional objects.

One category of SFF that has emerged is selective deposition modeling, herein referred to as "SDM". In SDM, a build material is physically deposited in a layerwise fashion while in a flowable state and allowed to solidify to form an object. In one type of SDM technology the modeling material is extruded as a continuous filament through a resistively heated nozzle. In yet another type of SDM technology the modeling material is jetted or dropped in discrete droplets in order to build up a part. In one particular SDM apparatus, a thermoplastic material having a low-melting point is used as the solid modeling material, which is delivered through a jetting system such as those used in ink jet printers. One type of SDM process utilizing ink jet print heads is described, for example, in U.S. Pat. No. 5,555,176 to Menhennett, et al.

Because ink jet print heads are designed for use in two-dimensional printing, special modifications must be made in order to use them in building three-dimensional objects by SFF techniques. This is generally because there are substantial differences between the two processes requiring different solutions to different problems. For example, in two-dimensional printing a relatively small amount of a liquid solution is jetted and allowed to dry or solidify with a significant interest being given to print resolution. Because only a small amount of material is jetted in two-dimensional printing, the material reservoir for the liquid solution can reside directly in the ink jet print head while providing the ability to print numerous pages before needing to be refilled or replaced. In contrast, in SDM a normally solid material, such as a thermoplastic or wax material, must be heated to a flowable state in order to be jetted, and then allowed to solidify. Furthermore, in SDM dispensing resolution is not as critical as it is in two-dimensional printing. This is generally because, for each targeted pixel location, the amount of material to be jetted in SDM techniques is substantially greater than the amount to be jetted in two-dimensional printing techniques. For example, it may be required to deposit six droplets on a particular pixel location in SDM compared to just one or two droplets in two-dimensional printing. Although the targeting accuracy may be the same, the actual resolution achieved in SDM techniques is generally somewhat less than in two-dimensional printing because the six droplets dispensed may droop or slide towards adjacent pixel locations.

Another difference is that because of the substantially greater amount of material jetted in SDM, the rate at which objects are formed becomes important. Since achieving higher build rates in SDM has been a high priority, initial SDM techniques dedicated all the discharge orifices in the ink jet print heads to dispense a single build material to maximize the build rate of forming the three-dimensional object. However, this sacrifices the ability to selectively dispense multiple colors from the print head when forming the object.

The differences mentioned above are significant and create a number of problems to be resolved. For instance, the amount of material deposited in SDM techniques, both in volume and in mass, can be so substantial that it is generally considered impractical to mount a reservoir directly on die ink jet print head to hold all of the material. Thus, it is typical in most SDM systems to provide a large reservoir at a remote location from the print bead that is in communication with the ink jet print head via a material delivery system having a flexible umbilical cord. However, the large container and umbilical cord must be heated to cause at least some of the build material to become or remain flowable so that the material can flow to the dispensing device. Undesirably, start up times are longer for SDM techniques using ink jet print heads than in two-dimensional printing with ink jet print heads due to the length of time necessary to initially heat the solidified material in the large remote reservoir to its flowable state. In addition, a significant amount of energy is required to maintain the large quantity of material in the flowable state in the reservoir and in the delivery system during the build process. This undesirably generates a significant amount of heat in the build environment.

As higher build speeds have been a priority in SDM techniques, previous expedients have abandoned the color dispensing capabilities of the ink jet print heads and have instead dedicated all of the dispensing orifices of the print heads to dispensing a single build material provided from a single large reservoir. According to these prior art delivery systems multiple remote reservoirs and delivery systems would be necessary in order to dispense multiple materials to produce multiple colors in an object. This would multiply the complexity and cost of such a system and is generally not practical. Thus, there is a need to overcome the limitations of the prior art SFF feed systems that utilize a remotely heated material reservoir. There is also a need to develop a feed system for an ink jet print head used in SFF that can take advantage of the color dispensing capabilities of the print heads.

Previous expedients have been proposed for delivering a phase change ink to a print head for two dimensional printing. For example, in U.S. Pat. No. 5,861,903 to Crawford et al., a supply of ink sticks or blocks are linearly stacked in a loading bin that biases the stick at the end of the stack against a melt plate and the melted ink then drips into the print head in a liquid state. Similarly in U.S. Pat. No. 4,593,292 to Lewis and in U.S. Pat. No. 4,609,924 to De Young, a long block of solid ink is biased against a heater plate to melt the ink for delivery of the melted ink to a print head. Also, in U.S. Pat. No. 4,636,803 a supply of cylindrical pellets of solid ink are advanced along an elongated array prior to being melted for use by an ink jet print head. In U.S. Pat. No. 4,631,557 to Cook et al., a cartridge holding a phase change material is heated to allow the melted material to drain into a supply system for a print head. In U.S. Pat. No. 4,682,185 to Martner, a flexible web of hot melt ink is advanced on a spool to a heater where the material is then melted prior to delivery to a ink jet print head. In U.S. Pat. No. 5,341,164 to Miyazawa et al., a number of embodiments of an ink jet supply system are disclosed. In one embodiment an elongated array of solid ink is advanced and broken off at cutouts prior to being melted. In another embodiment, a vertical array of solid spheres of ink are held in single file and are selectively dropped into the print head. However, these prior expedients are directed to feed systems for two-dimensional printing and do not address the problems confronted in SDM techniques, such as how to handle and deliver the significantly larger quantity of build material needed to form three-dimensional objects. For example, the prior linear or array feed systems, if used for SDM, would have to be extremely long in order to hold the quantity of material needed, or require constant manual refilling during the build process. Neither of these alternatives are desirable in SDM.

Another problem that is unique to SDM techniques is that the layers being formed must be shaped or smoothed during the build process to establish a uniform layer. Normalizing the layers is commonly accomplished with a planarizer that removes a portion of the material dispensed in the layers. One such planarizer is disclosed in U.S. Pat. No. 6,270,335 to Leyden et al. However, the planarizer produces waste material during the build process that must be handled. Normally this is not a concern when working with non-reactive materials; however, it can become a problem when reactive materials are used. For example, most photopolymers are reactive, and excessive contact to human skin may result in sensitivity reactions. Thus, most all SFF processes that utilize photopolymer materials require some additional handling procedures in order to minimize or eliminate excessive physical contact with the materials. For example, in stereolithography, operators typically wear gloves when handling the liquid resin and when removing finished parts from the build platform. However, SDM operators who normally handle non-reactive materials consider additional handling procedures inconvenient and, if possible, would prefer they be eliminated. Thus, there is a need to provide a material feed and waste system for SDM that can handle reactive materials without requiring the implementation of special handling procedures.

These and other difficulties of the prior art are overcome according to the present invention by providing build material to the dispensing device of a SFF apparatus in discrete portions on an as needed basis when the apparatus is forming a three-dimensional object.

BRIEF SUMMARY OF THE INVENTION

The present invention provides its benefits across a broad spectrum of SFF processes by providing a build material to the dispensing device of a SFF apparatus in discrete portions on an as needed basis when forming a three-dimensional object.

It is one aspect of the present invention to provide a new build material feed system for an SFF apparatus which overcomes the above-mentioned disadvantages of the prior art.

It is another aspect of the present invention to provide a new build material feed system for an SFF apparatus that takes advantage of the multiple color dispensing capabilities of an ink jet print head when forming three-dimensional objects.

It is a feature of the present invention that the feed system delivers the build material to the dispensing device as needed in discrete amounts to form three-dimensional objects.

It is still another feature of the present invention that the build material delivered by the feed system is heated to a flowable state adjacent the dispensing device and is passed through a capillary valve into to a dispensing chamber which is maintained at sub-atmospheric pressure.

It is an advantage of the present invention that it is no longer necessary to maintain a large quantity of build material in a flowable state in a remote reservoir at an elevated temperature in an SDM apparatus.

It is another advantage of the present invention that materials can be used by an SDM apparatus without requiring the implementation of special handling procedures for the material.

It is yet another advantage of the present invention that the amount of radiant heat generated by an SDM apparatus is substantially reduced.

It is still yet another advantage of the present invention feed system that ink jet print heads can be utilized to build three-dimensional objects by SFF techniques having visual attributes such as color.

These and other aspects, features, and advantages are achieved according to the method and apparatus of the present invention that employs a unique build material feed system that delivers a discrete amount of build material on an as needed basis in a non-flowable state to a dispensing device. After the material is delivered to the dispensing device, it is changed from the non-flowable state to a flowable state wherein it may then be selectively dispensed to form a three-dimensional object in a layerwise fashion.

BRIEF DESCRIPTION OF THE DRAWINGS

These and other aspects, features and advantages of the present invention method and apparatus will become apparent upon consideration of the following detailed disclosure of the invention, especially when it is taken in conjunction with the accompanying drawings wherein:

FIG. 8 is a isometric view of a SDM apparatus of the embodiment shown schematically in FIG. 7

To facilitate understanding, identical reference numerals have been used, where possible, to designate identical elements that are common to the figures.

DETAILED DESCRIPTION OF THE PREFERRED EMBODIMENTS

Figure 1:
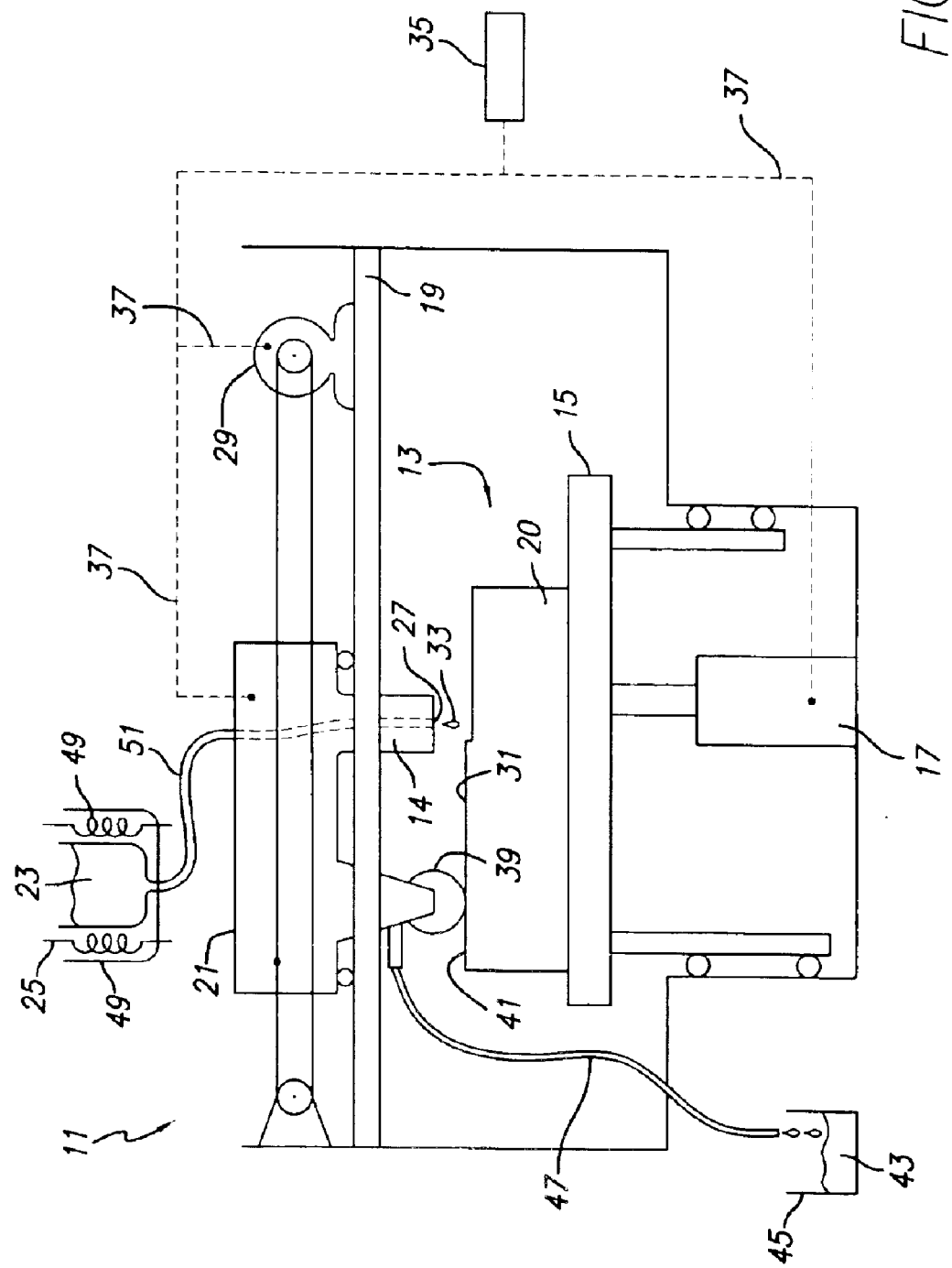
FIG. 1 is a diagrammatic side view of a prior art solid deposition modeling apparatus.

The present invention provides its benefits across a broad spectrum of SFF processes. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

While the present invention is applicable to all SFF techniques and objects made therefrom, the invention will be described with respect to solid deposition modeling utilizing a build material that is dispensed in a flowable state. However it is to be appreciated that the present invention can be implemented with any SFF technique utilizing a wide variety of build materials. For example, the build material can be a photocurable or sinterable material that is heated to a flowable state but when solidified may form a high viscosity liquid, a semi-solid, a gel, a paste, or a solid. In addition, the build material may be a composite mixture of components, such as a mixture of photocurable liquid resin and powder material such as metallic, ceramic, or mineral, if desired.

As used herein, the term "a flowable state" of a build material is a state wherein the material is unable to resist shear stresses that are induced by a dispensing device, such as those induced by an ink jet print bead when dispensing the material, causing the material to move or flow. Preferably the flowable state of the build material is a liquid state, however the flowable state of the build material may also exhibit thixotropic properties. The term "solidified" and "solidifiable" as used herein refer to the phase change characteristics of a material where the material transitions from the flowable state to a non-flowable state. A "non-flowable state" of a build material, as used herein, is a state wherein the material is sufficiently self-supportive under its own weight so as to hold its own shape. A build material existing in a solid state, a gel state, a paste state, or a thixotropic state, are examples of a non-flowable state of a build material for the purposes of discussion herein. Further, the term "cured" or "curable" refers to any polymerization reaction. Preferably the polymerization reaction is triggered by exposure to radiation or heat energy. Most preferably the polymerization reaction involves the cross-linking of monomers and oligomers initiated by exposure to actinic radiation in the ultraviolet or infrared wavelength band. Further, the term "cured state" refers to a material, or portion of a material, in which the polymerization reaction has substantially completed. It is to be appreciated that as a general matter the material can easily transition between the flowable and non-flowable state prior to being cured, however, once cured, the material cannot transition back to a flowable state and be dispensed by the apparatus. Additionally, the term "support material" refers to any material that is intended to be dispensed to form a support structure for the three-dimensional objects as they are being formed, and the term "build material" refers to any material that is intended to be dispensed to form the three-dimensional objects. The build material and the support material may be similar materials having similar formulations but, for purposes herein, they are to be distinguished only by their intended use. A preferred method for dispensing a curable phase change material to form a three-dimensional object and for dispensing a non-curable phase change material to form supports for the object is disclosed in the concurrently filed U.S. patent application Ser. No. 09/971,337, filed Oct. 3, 2001, entitled "Selective Deposition Modeling with Curable Phase Change Materials", which is herein incorporated by reference as set forth in full. A preferred curable phase change material and non-curable phase change support material is disclosed in the concurrently filed U.S. patent application Ser. No. 09/971,247, filed Oct. 3, 2001, entitled "Ultra-Violet Light Curable Hot Melt Composition", which is herein incorporated by reference as set forth in full.

Referring particularly to FIG. 1, there is illustrated generally by the numeral 11 a prior art SDM apparatus that can be adapted to incorporate the present invention build material feed system. The SDM apparatus 11 is shown building a three-dimensional object 20 in a build environment indicated generally by the numeral 13. The object is built in a layer by layer manner on a build platform 15 that can be precisely positioned vertically by any conventional actuation means 17. The object is built in a layerwise manner by dispensing a build material in a flowable state. Generally, the build material is normally in a non-flowable state and changes to a flowable state when maintained at or above the flowable temperature of the material. The build environment 13 is maintained at a temperature below the flowable temperature of the build material so that the three-dimensional part will solidify as the build material is dispensed. Directly above and parallel to the build platform 15 is a rail system 19 on which a trolley 21 carrying a dispensing device 14 resides.

Generally, the trolley carrying the dispensing device is fed a build material 23 from a remote reservoir 25 due to the large quantity of material typically needed to be dispensed by the SDM apparatus to build a three-dimensional object. In order to dispense the material, a heating means must be provided to heat the material to a flowable state in the reservoir 25 and to maintain the temperature of the material above the flowable temperature of the build material. Preferably, the flowable state of the build material is a liquid state. Changing the material to the flowable state is initially achieved and maintained by the provision of heaters 49 on the reservoir 25 and by the provision of heaters (not shown) on the umbilical 51 connecting the reservoir 25 to the dispensing device 21. Located on the dispensing device 21 is at least one discharge orifice 27 for dispensing the build material. A reciprocating means is provided for the dispensing device 21 which is reciprocally driven on the rail system 19 along a horizontal path by a conventional drive means 29 such as an electric motor. Generally, the trolley carrying the dispensing device 21 takes multiple passes to dispense one complete layer of material from the discharge orifice 27. In FIG. 1, a portion of a layer of dispensed material 31 is shown as the trolley has just started its pass from left to right. A dispensed droplet 33 is shown in mid-flight, and the distance between the discharge orifice 27 and the layer 31 of build material is greatly exaggerated for ease of illustration. Also shown in FIG. 1, is a planarizer 39 that is used to successively shape the layers as needed. Such shaping is typically needed in order to eliminate the accumulated effects of drop volume variation, thermal distortion, and the like, which occur during the build process. After shaping, a smooth uniform layer is achieved as indicated by numeral 41. Excess material 43 removed by the planarizer 39 travels through a waste umbilical 47 to waste bin 45. The waste material 43 may be discarded or recycled, which generally depends on the nature of the material and the operating characteristics of the system.

Preferably, a remote computer 35 takes a CAD data file and generates three-dimensional coordinate data of an object, commonly referred to as an STL file. When a user desires to build an object, a print command is executed at the remote computer in which the STL file is processed through print client software that is sent to the SDM apparatus 11 as a print job. The print job is processed and transmitted to the SDM apparatus by any conventional data transferable medium desired, such as by magnetic disk tape, microelectronic memory, or the like. The data transmission route and controls of the SDM apparatus are represented as dashed lines at 37. The data is processed into a prescribed pattern for each layer of the three-dimensional object to be built. A computer controller (not shown) utilizes the prescribed pattern data to produce the appropriate control commands to operate the apparatus to form the three-dimensional object.

Figure 2:
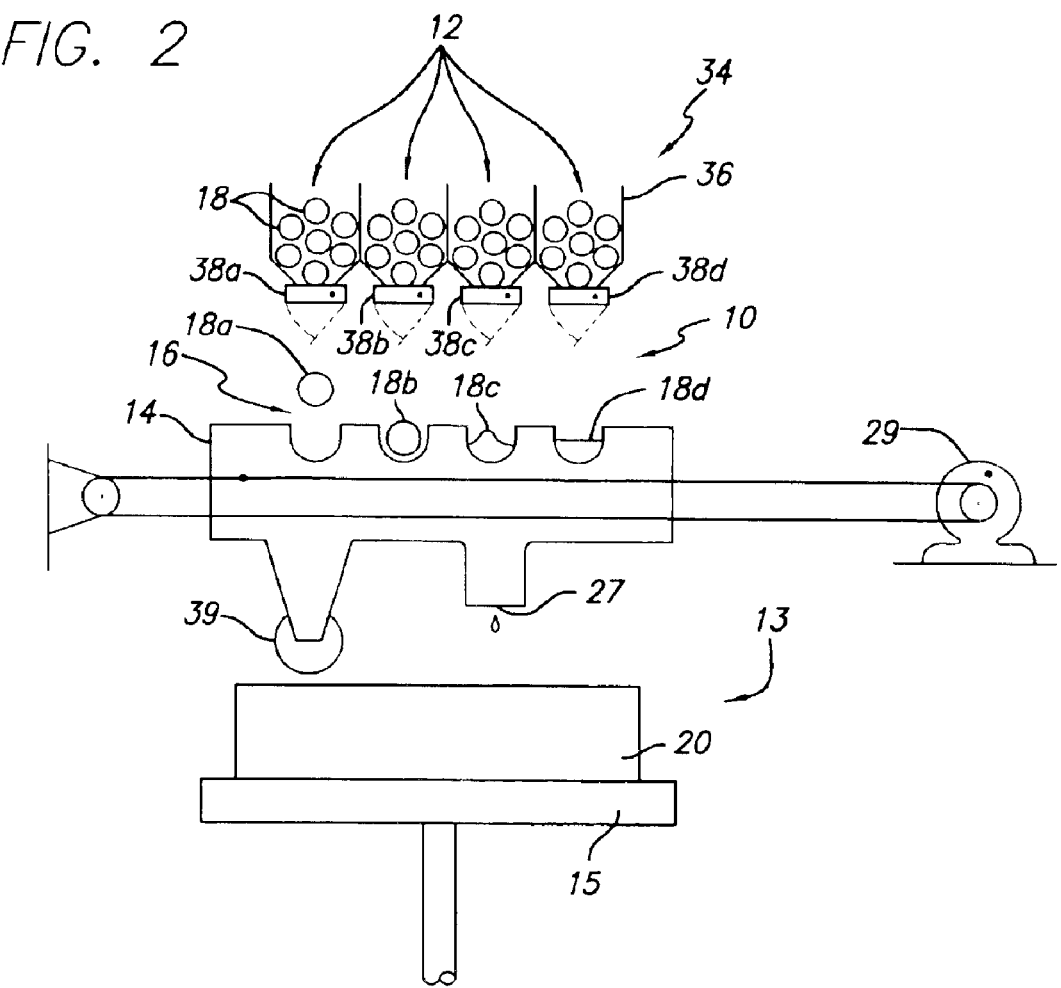
FIG. 2 is a diagrammatic side view of an embodiment of the present invention feed system for use with the solid deposition modeling apparatus of FIG. 1.

Now, according to the present invention, a new build material feed system generally shown by the numeral 10 in FIG. 2 and may be used in conjunction with the prior art solid deposition modeling apparatus 11 shown in FIG. 1. Advantageously, the new build material feed system 10 eliminates the reservoir 25, the umbilical 51, and the heater elements 49 attached to the reservoir of the prior art apparatus. The new method for dispensing the build material by the present invention apparatus comprises providing at least one queue station for holding a plurality of discrete amounts of a build material in a non-flowable state. A plurality of discrete amounts of build material are then loaded in the queue station in a random order. A discrete amount of build material is then delivered to at least one hopper on the dispensing device. The discrete amount of build material is then changed from the non-flowable state to the flowable state. The build material in the flowable state is then moved to a receptacle of the dispensing device and is finally dispensed in the flowable state in a layerwise fashion to form layers of a three-dimensional object. An additional step of providing an environment for the build material to return to the non-flowable state after being dispensed in a layer may be implemented, if needed.

In one embodiment, the discrete non-flowable build material is delivered in a drop-in-load manner to hoppers located on the dispensing devices. The hoppers are provided with heaters which induce the build material to change to the flowable state. The hoppers are in communication with a receptacle via a passageway wherein the flowable build material is delivered through the passageway and into the volume of the receptacle which holds the material in the flowable state. The material is then dispensed through the discharge orifices of the dispensing device. In one embodiment the passageway comprises a capillary valve having an effective capillary force greater than the capillary force of the discharge orifices to allow the flowable build material to be drawn into the receptacle. The receptacle is maintained at sub-atmospheric pressure so as to prevent the build material from draining from the discharge orifices, and also to assist in drawing new build material into the receptacle from the hopper. In another embodiment, at least one hopper and at least one receptacle is provided for each dispensing device.

Preferably the dispensing device is an ink jet print head although other dispensing devices may be used, if desired. In one embodiment, at least one hopper is provided with a dispensing device for receiving a build material to be dispensed to form the three-dimensional object, and at least one hopper is provided with the dispensing device for receiving a support material for forming a support structure for the object. In another embodiment, one ink jet print head dispenses a build material to form the three-dimensional object and another ink jet print head dispenses a support material to form supports for the object.

In yet another embodiment, each hopper is associated with a unique visual characteristic and discrete amounts of build material indicative of the associated visual characteristic are delivered to the appropriate hoppers. Preferably, a color additive such as a dye or pigment is provided in the discrete amounts of build material for the colors cyan, magenta, yellow, and black. The different colored build materials are selectively delivered to the specific hoppers to enable the SFF apparatus to form three-dimensional objects in color. This is accomplished by providing a plurality of discharge orifices to be in communication with each receptacle associated with a given hopper so that the dispensing device can selectively dispense the build material with any color additive to any coordinate in any layer on the three-dimensional object.

Alternatively, the hoppers may be associated with different mechanical properties related to different formulations of build materials in which the discrete build material feed system would enable the formation of non-homogeneous three-dimensional objects by any SFF technique.

In a preferred embodiment, the feed system is integrated with a waste removal system and the discrete amounts of build material are provided in containers. The containers include a waste receptacle wherein waste material generated when shaping the layers is deposited into the waste receptacle. Preferably the feed system handles two separate materials, one being a build material to form the object and the other being a support material for supporting the object during the build process. Once substantially all of the material in a container has been dispensed, the waste receptacle containing the waste material is hermetically sealed shut and the container is ejected. Advantageously, the containers can be handled without requiring any special handling procedures for the waste material. This makes the waste safe for disposal such as by delivery to a facility that can remove the waste material and recycle the containers, if desired. Alternatively, if the waste material is reactive to actinic radiation it may be cured by exposure to such radiation in the waste receptacle, if desired.

Now referring back to FIG. 2, the build material feed system 10 generally comprises a dispensing device 14 and a build material delivery means generally shown by numeral 34. In this embodiment the build material delivery means can more generally be described as a mechanical indexer capable of delivering discrete amounts of non-flowable build material on an as needed basis to the dispensing device 14. Discrete amounts of build material are shown by numeral 18, which in this embodiment are spherically shaped having an average spherical diameter of approximately one inch. However, the shape of the discrete amounts of build material may be cubic, conical, cylindrical, or the like. They may also be formed in any common uniform shape such as, for example, the shapes commonly used in the pharmaceutical industry for tablets and pills. They may also take the shape of pellets or may even be granules. Alternatively the shapes may be non-uniform or random, if desired.

Before the discrete amounts of build material are delivered to the dispensing device, they are held in material queue stations generally shown by the numeral 12. The queue stations are established by the provision of at least one holding bin shown by the numeral 36. Preferably each holding bin only contains a plurality of discrete amounts of build material that all have a common characteristic, for example, such as containing the same color additive, the same material formulation, or the like. Importantly, a large quantity of discrete amounts of build material are contained in the queue stations since most SDM techniques must dispense a must larger quantity of material from the printhead compared to the quantity of material dispensed in two-dimensional printing techniques. As such, the queue stations 36 are substantially large, and as shown in FIG. 2, the discrete amounts of build material 18 are randomly placed within the queue station. In this configuration, the random placement of the material 18 in the queue stations saves a significant amount of space in the apparatus compared to stacking the material in a linear fashion.

Shown by numerals 38A through 38D are dispensing actuators which deliver the discrete amounts of build material to the hoppers 16 located on the dispensing device 14. Preferably there is one hopper 16 for each material queue station 12, and at least one hopper 16 for each dispensing device 14. When a hopper is low on build material, the computer control system (not shown) activates the appropriate dispensing actuator (38A through 38D) to deliver a discrete amount of build material 18 to the hopper 16. Preferably, a sensor (not shown) is provided for each hopper 16 which detects a low condition of the hopper. In response to the low condition, the computer control system delivers a signal to the dispensing actuator associated with the hopper in the low condition. This signal triggers the dispensing actuator to deposit a discrete amount of build material to the hopper. For example, shown by numeral 18A in FIG. 2, a discrete amount of build material is in mid-flight being delivered to the hopper 16. This demonstrates a drop-in-load manner of delivering the build material to the dispensing device 14.

The present invention is unique in that the discrete amounts of unused build material 18 are delivered on an as-needed basis to the dispensing device 14 in a non-flowable state. This discrete or quantized approach to delivering build material to the dispensing device of an SFF apparatus produces significant advantages over prior art SFF systems. One advantage is that it completely eliminates the prior art heated reservoir and umbilical delivery system. More importantly the system is readily adaptable for dispensing any number of different build materials simultaneously. For example, color additives such as dyes or pigments can be premixed in the discrete amounts of build material 18 which are then delivered to their respective hoppers on the dispensing device 14 in order to build three-dimensional objects in color.

The next step in the build material feed system once the discrete amounts of build material 18 have been delivered to the hopper 16 is to change the non-flowable state of the build material to a flowable state. Preferably, a heating means is provided on the dispensing device, such as by the provision of heater elements (not shown) on the dispensing device and hopper in order to raise the temperature of the material to change from the non-flowable to a flowable state. The change in state is shown in FIG. 2 by numerals 18B, 18C and 18D, wherein the build material is shown progressively changing from the non-flowable state to the flowable state. Shown in FIG. 3, the hopper 16 includes a containment wall 26 which may also be used to transfer heat to the discrete amount of build material 18 causing it to transition to the flowable state, as shown by numeral 32. It is in this flowable state where the build material is capable of being delivered to the receptacle to be selectively dispensed by the discharge orifice 27 of the dispensing device. Although only one hopper 16 and receptacle 22 are shown in FIG. 3, any number or combination may be used for each dispensing device, as desired.

Figure 3:
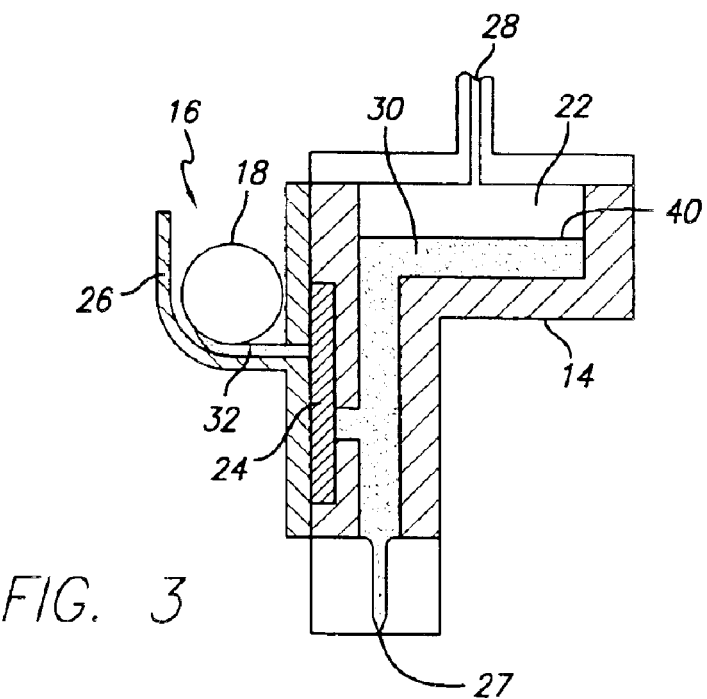
FIG. 3 is a diagrammatic side view of a portion of the present invention feed system shown attached to an ink jet print head.

Now referring to FIG. 3, a diagrammatic cross-sectional view is shown of the dispensing device 14. The dispensing device 14 is provided with a receptacle 22 that is in communication with the hopper 16 via a passageway or capillary valve 24. The receptacle contains a volume of build material in a flowable state as identified by numeral 30. Preferably, the passageway is a capillary valve having an effective capillary force that is greater than the capillary force of the discharge orifice 27. Typically the capillary force of most ink jet print heads is between about 3 to 9 inches of $H_2O$. Thus, it is desirable to select a porous material for the capillary valve 24 having an effective capillary force greater than about 9 inches of $H_2O$. Satisfactory results can be achieved using metal mesh filters having an effective capillary force of between about 25 to 60 inches of $H_2O$. With sub-atmospheric pressure being applied to the receptacle 22, the flowable build material 32 is drawn through the capillary valve or passage 24 and into the receptacle 22. Shown in FIG. 3 the sub-atmospheric pressure is applied to the volume of material in the receptacle 22 via a vacuum line connection 28. Alternatively the receptacle may comprise a generally sealed membrane, or the like, and the sub-atmospheric pressure can be established by providing a biasing spring inside the membrane, if desired. Generally the sub-atmospheric pressure is needed to prevent the flowable build material 30 in the reservoir or receptacle 22 from draining through the discharge orifice 27 when the ink jet print head is not in use. The capillary valve shown in FIG. 3 is conceptually similar to that as disclosed in U.S. Pat. No. 5,280,300 to Fang et al. wherein the capillary valve is used in connection with refilling an aqueous ink solution into an ink jet cartridge.

Preferably, the upper surface level 40 of the flowable build material 30 in receptacle 22 is monitored by a sensor (not shown). As the material is being dispensed from the discharge orifice 27, the volume of flowable build material 30 in the receptacle starts to decrease, resulting in a low condition that is detected by the sensor. The sensor then provides a signal to the computer controller which in turn signals the appropriate dispensing actuator (38A–38D) to delivering another discrete amount of non-flowable build material 18 into the hopper 16. This unused material then changes to the flowable state, for example by the application of heat, and is drawn into the receptacle 22 to replenish the supply of flowable build material 30. Thus, the sensor(s), the dispensing actuator(s), and computer control system operably function to deliver the discrete amounts of build material to the hoppers on an as-needed basis.

It is to be appreciated that a unique feature of the present invention is that discrete non-flowable amounts of build material are selectively delivered directly to the dispensing device. Many advantages are achieved by delivering discrete non-flowable amounts of build material to the dispensing device. For example, there is no longer a need to provide a large heated remote container of flowable material delivered via an umbilical cord to the dispensing device. This eliminates a substantial amount of heat previously provided to maintain the material in the flowable state. However, there are other unique advantages to the present invention. Because discrete amounts of material are selectively delivered to the various hoppers, the system can be easily adapted to either selectively dispense different materials, or to selectively dispense a single build material with different additives such as pigments or dyes, if desired.

For example, in one embodiment a hopper may be dedicated to deliver a build material that is dispensed exclusively for building the three-dimensional object 20 while other hoppers may be dedicated to delivering a support material to be dispensed exclusively for forming a support structure for the three-dimensional object. Alternatively, there could be more than one dispensing device 14. i.e. ink jet print head, where one could be dedicated to exclusively dispense build material to form the three-dimensional object, and another could be dedicated to exclusively dispense the support material to form a support structure for the three-dimensional object, as needed.

In another embodiment the dispensing device 14 may have a plurality of hoppers 16 wherein each hopper is associated with a unique visual characteristic. The unique visual characteristic associated with the hoppers may be indicative of color, shading, texture, fluorescence, or translucency. For example, if color were the unique visual characteristic associated with the hoppers, tablets or pellets of the build material in which a color additive has already been included would be delivered exclusively to a hopper associated with that color. Thus, it is envisioned that the discrete amounts of build material may be selectively delivered to the hoppers with specific color additives to enable the ink jet print head to build three-dimensional objects in color. In one embodiment, color additives indicative of cyan, magenta, yellow, and black may be provided to the discrete amounts of build material and selectively delivered to hoppers associated with cyan, magenta, yellow and black. The hoppers may then be in communication with receptacles allowing the build material of the different colors to be selectively dispensed to any coordinate of any layer of the three-dimensional object. Preferably, a plurality of discharge orifices are provided that are in communication with each receptacle associated with each hopper such that the dispensing device can selectively dispense the build material with any color additive to any coordinate of the three-dimensional object. Thus, it is envisioned that three-dimensional color building may be achieved in SDM by utilizing the unique dispensing device of the present invention.

Alternatively, the hoppers could be associated with different mechanical properties of different build material formulations. For example, build materials having different mechanical properties could be selectively dispensed to any coordinate in any layer of the three-dimensional object. This would desirably produce composite non-homogeneous three-dimensional objects, for example, such as part ceramic and part metallic objects.

Figure 7:
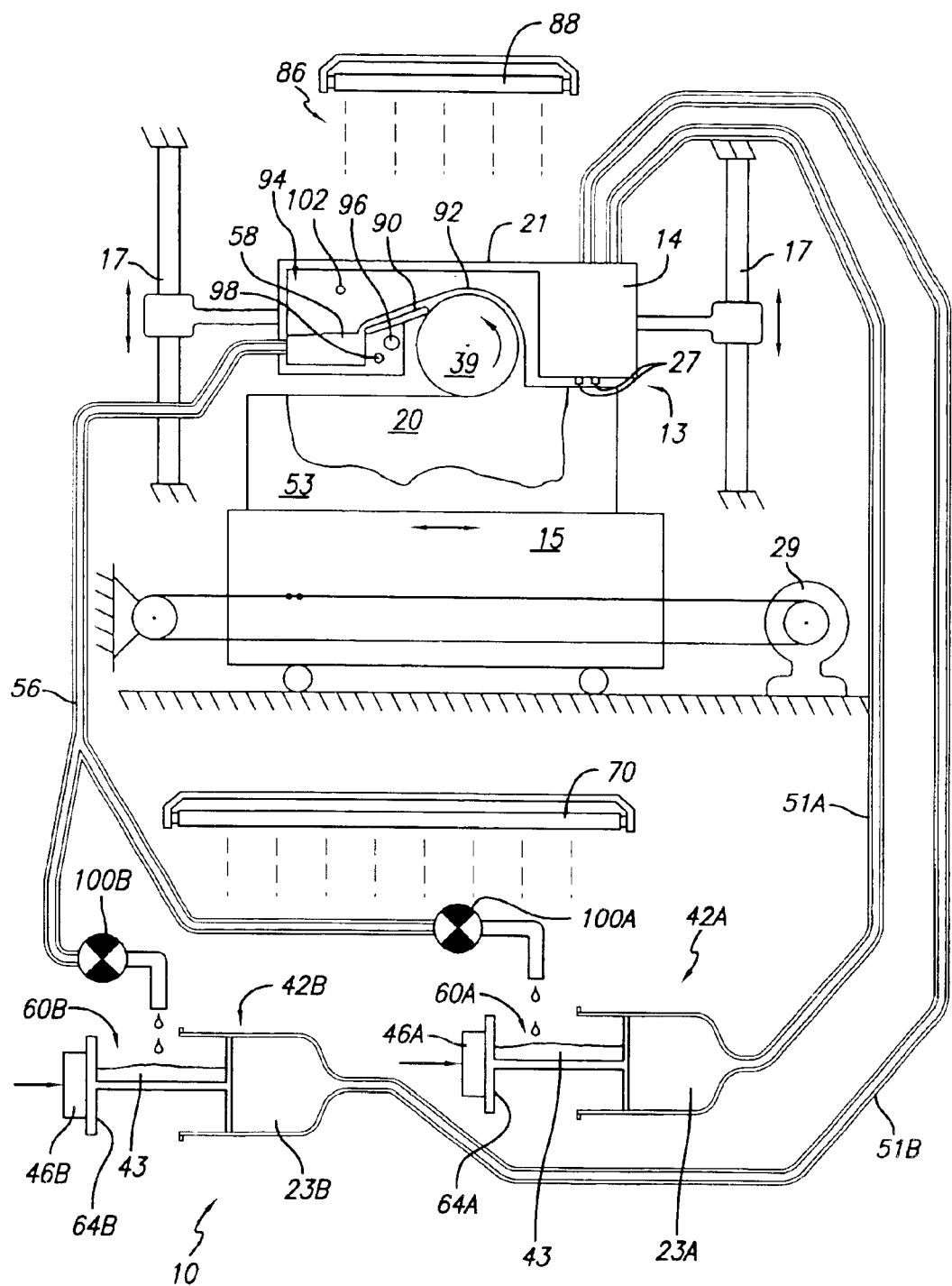
FIG. 7 is a schematic view of a preferred embodiment of the present invention.

The dispensing device shown in the FIG. 1 reciprocates in a horizontal plane while the build platform remains stationary. However other motion means may be used for moving the dispensing device and the build platform respectively when dispensing the build material. For example, the dispensing device could be held stationary and the build platform could be reciprocated, if desired, as shown in FIG. 7. Further, both the dispensing device and the build platform may reciprocate, if desired. In addition, if two or more dispensing devices are used, they may be configured to reciprocate in different directions within a horizontal plane, if desired. Alternatively the motion means does not need to rely on reciprocation. For example the build platform could continuously rotate about an axis adjacent a stationary dispensing device, and vise versa, if desired.

Figure 4:
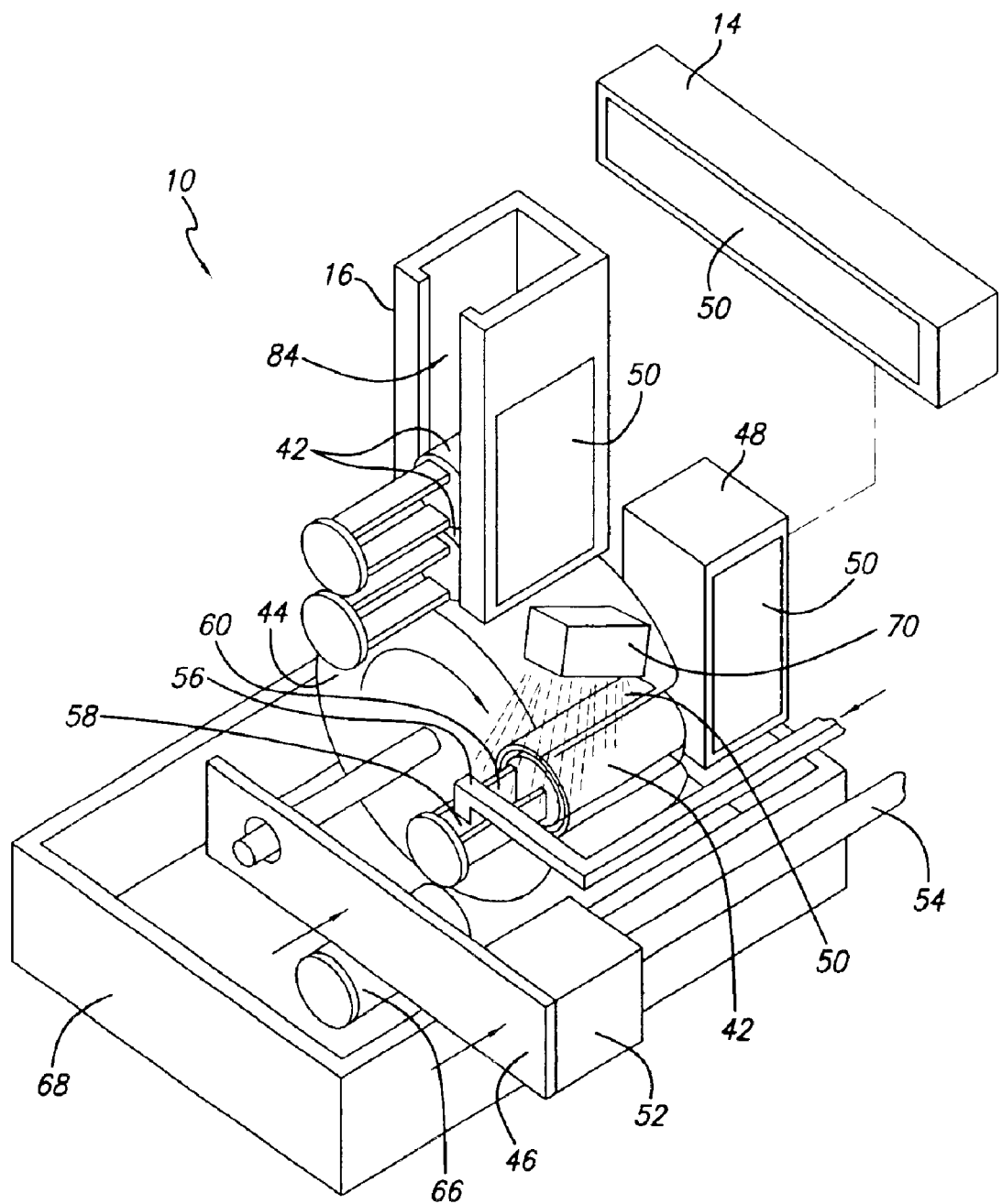
FIG. 4 is a diagrammatic isometric view of an alternate embodiment of the present invention feed system.

Referring to FIG. 4, a preferred embodiment of the build material feed system 10 is shown. In this embodiment the queue station 12 forms a magazine for holding a plurality of containers 42. The containers hold a discrete amount of build material that is initially in a non-flowable state. Preferably the containers 42 are cartridges containing unused material and are initially loaded into the magazine manually by an operator, however the loading process could be automated, if desired. In this embodiment the cartridges are stacked in a linear fashion. By providing a significantly large amount of build material in each cartridge, the length of the magazine can be minimized to an acceptable size, making linear stacking of the cartridges feasible. Providing a significantly large amount of build material in the cartridges is possible since the material in each cartridge is slowly expelled as needed to feed to the print head instead of being delivered all at once to the print head. The hopper comprises a mechanical indexer 44 that receives the cartridges and then rotates them into a position where an extrusion bar 46 applies force to the cartridge to remove the build material from the cartridge. The material is removed through an orifice at its end (shown at 70 in FIG. 5) and into a filter 48. The extrusion bar 46 is biased axially along a shaft 54 by a feed motor 52. As the extrusion bar 46 applies the force to expel the build material, the material passes through the filter 48 and is delivered to the dispensing device 14.

It is to be appreciated that the amount of force applied by the extrusion bar exerts a substantial amount of shear stress on the material in the cartridge to expel the material. The amount of this force is so substantial that the material need not be in a flowable state to be expelled from the cartridge. Depending on the build material and the specifications of the dispensing device, the filter may be omitted. However, if an ink jet print head is used as the dispensing device, it may be desirable to run the build material through a 5-micron filter prior to delivering the material to the print head. Alternatively the filter may be omitted from the SDM apparatus if the material is run through a filter prior to loading the material in the cartridges. In this embodiment the discrete amounts of build material in the cartridges are delivered to the queue station 12 while the build material is in a nonflowable state. Heater elements, identified by numeral 50 are situated on the queue station 12, on the indexer 44, on the filter 48, and on the dispensing device 14. The heater elements 50 provide thermal heat to change the build material to the flowable state and to maintain the build material in the flowable state as it moves through the delivery system to the print head. Preferably the build material transforms from the non-flowable state to the flowable state in the cartridge prior to being delivered to the indexer 44, although this is not required.

Unique to the embodiment in FIG. 4 is the integration of a waste removal means with the build material feed system 10. Waste material (shown in FIG. 7 by numerals 58, 92, and 43) generated during planarizing is returned through a waste umbilical 56 and is delivered to a waste receptacle 60 provided on the container 42. The waste removal means is unique in that it can take reactive waste material, such as an uncured photopolymer material, and hermetically seal the waste material in each cartridge prior to ejecting each cartridge. Desirably, the sealed and ejected containers 66 can be directly handled by personnel in an office environment thereby eliminating the need for special handling procedures for the waste material.

Referring particularly to FIG. 7 there is illustrated generally by the numeral 86 a preferred solid freeform fabrication apparatus. This apparatus 86 is shown including schematically the material feed and waste system 10 of FIG. 4. In contrast to the prior art apparatus shown in FIG. 1, the build platform 15 is reciprocally driven by the conventional drive means 29 instead of the dispensing trolley. The dispensing trolley 21 is precisely moved by actuation means 17 vertically to control the thickness of the layers of the object 20. Preferably the actuation means 17 comprises precision lead screw linear actuators driven by servomotors. In the preferred embodiment the ends of the linear actuators 17 reside on opposite ends of the build environment 13 and in a transverse direction to the direction of reciprocation of the build platform. However for ease of illustration in FIG. 7 they are shown in a two-dimensionally flat manner giving the appearance that the linear actuators are aligned in the direction of reciprocation of the build platform 15. Although they may be aligned with the direction of reciprocation it is preferred they be situated in a transverse direction so as to optimize the use of space within the apparatus.

In the build environment generally illustrated by numeral 13, there is shown by numeral 20 a three-dimensional object being formed with integrally formed supports 53. The object 20 and supports 53 both reside in a sufficiently fixed manner on the build platform 15 so as to sustain the acceleration and deceleration effects during reciprocation of the build platform while still being removable from the platform. In order to achieve this, it is desirable to dispense at least one complete layer of support material on the build platform before dispensing the build material since the support material is designed to be removed at the end of the build process. In this embodiment, the material identified by numeral 23A is dispensed by the apparatus 10 to form the three-dimensional object 20, and the material identified by numeral 23B is dispensed to form the support 53. Containers identified generally by numerals 42A and 42B respectively hold a discrete amount of these two materials 23A and 23B. Umbilicals 51A and 51B respectively deliver the material to dispensing device 27, which in the preferred embodiment is an ink jet print head having a plurality of dispensing orifices.

Preferably the materials 23A and 23B are phase change materials that are heated to a liquid state, and heaters (not shown) are provided on the umbilicals 51A and 51B to maintain the materials in a flowable state as they are delivered to the dispensing device 27. In this embodiment the ink jet print head is configured to dispense both materials from a plurality of dispensing orifices so that both materials can be selectively dispensed in a layerwise fashion to any location in any layer being formed. When the dispensing device 27 needs additional material 23A or 23B, extrusion bars 46A and 46B are respectively engaged to extrude the material from the containers 42A and 42B, through the umbilicals 51A and 52B, and to discharge orifices 27 of the dispensing device 14.

The dispensing trolley 21 in the embodiment shown in FIG. 7 comprises a heated planarizer 39 that removes excess material from the layers to normalize the layers being dispensed. The heated planarizer contacts the material in a non-flowable state and because it is heated, locally transforms some of the material to a flowable state. Due to the forces of surface tension, this excess flowable material adheres to the surface of the planarizer, and as the planarizer rotates the material is brought up to the skive 90 which is in contact with the planarizer 39. The skive 90 separates the material from the surface of the planarizer 39 and directs the flowable material into a waste reservoir identified generally by numeral 94 located on the trolley 21. A heater 96 and thermistor 98 on the waste reservoir 94 operate to maintain the temperature of the waste reservoir at a sufficient level so that the waste material in the reservoir remains in the flowable state.

The waste reservoir is connected to a heated waste umbilical 56 for delivery of the waste material to the waste receptacles 60A and 60B. The waste material is allowed to flow via gravity down to the waste receptacles 60A and 60B. Although only one umbilical 56 with a splice connection to each waste receptacle is shown, it is preferred to provide a separate waste umbilical 56 between the waste reservoir 94 and each waste receptacle 60A and 60B.

For each waste receptacle 60A and 60B, there is associated a solenoid valve 100A and 100B, for regulating the delivery of waste material to the waste receptacles. Preferably the valves 100A and 100B remain closed, and only open when the respective extrusion bars 46A and 46B are energized to remove additional material. For example, if only extrusion bar 46A is energized, only valve 100A is opened to allow waste material 43 to be dispensed into the waste receptacle 60A. This feedback control of the valves prevent delivery of too much waste material to either waste receptacle, by equalizing the delivery of waste material in the waste receptacles in proportion to the rate at which material is fed from the containers to the dispensing device. Thus, the delivery of waste material to the waste receptacles is balanced with the feed rates of build material and support material of the feed system.

In the embodiment of FIG. 7, an additional detection system is provided in the waste system to prevent the waste material from overflowing the waste reservoir 94. The system comprises an optic sensor 102 provided in the waste reservoir 94 that detects an excess level of waste material in the reservoir. If the level of the waste material in the waste reservoir 94 raises above a set level, it is detected by the sensor 102. The sensor 102 in turn provides a signal to the computer controller which shuts down the apparatus. This prevents waste material from flooding the components inside the apparatus in the event of a malfunction of the feed and waste system. The apparatus can then be serviced to correct the malfunction thus preventing excessive damage to the apparatus.

In the preferred embodiment shown in FIG. 7, the build material 23A is a phase change material that is cured by exposure to actinic radiation. After the curable phase change material 23A is dispensed in a layer it transitions from the flowable state to a non-flowable state. After a layer has been normalized by the passage of the planarizer 39 over the layer, the layer is then exposed to actinic radiation by radiation source 88. Preferably the actinic radiation is in the ultraviolet or infrared band of the spectrum. It is important, however, that planarizing occurs prior to exposing a layer to the radiation source 88. This is because the preferred planarizer can only normalize the layers if the material in the layers can be changed from the non-flowable to the flowable state, which cannot occur if the material 23A is first cured.

In conjunction with the curable build material 23A, a non-curable phase change material is used for the support material 23B. Since the support material cannot be cured, it can be removed from the object and build platform, for example, by being dissolved in a solvent. Alternatively the support material can be removed by application of heat to return the material to a flowable state, if desired.

In this embodiment the waste material comprises both materials as they accumulate during planarizing. Preferably, a second radiation source 70 is provided to expose the waste material in the waste receptacles to radiation to cause the material 23A to cure so that there is no reactive material in the waste receptacles.

Figure 5:
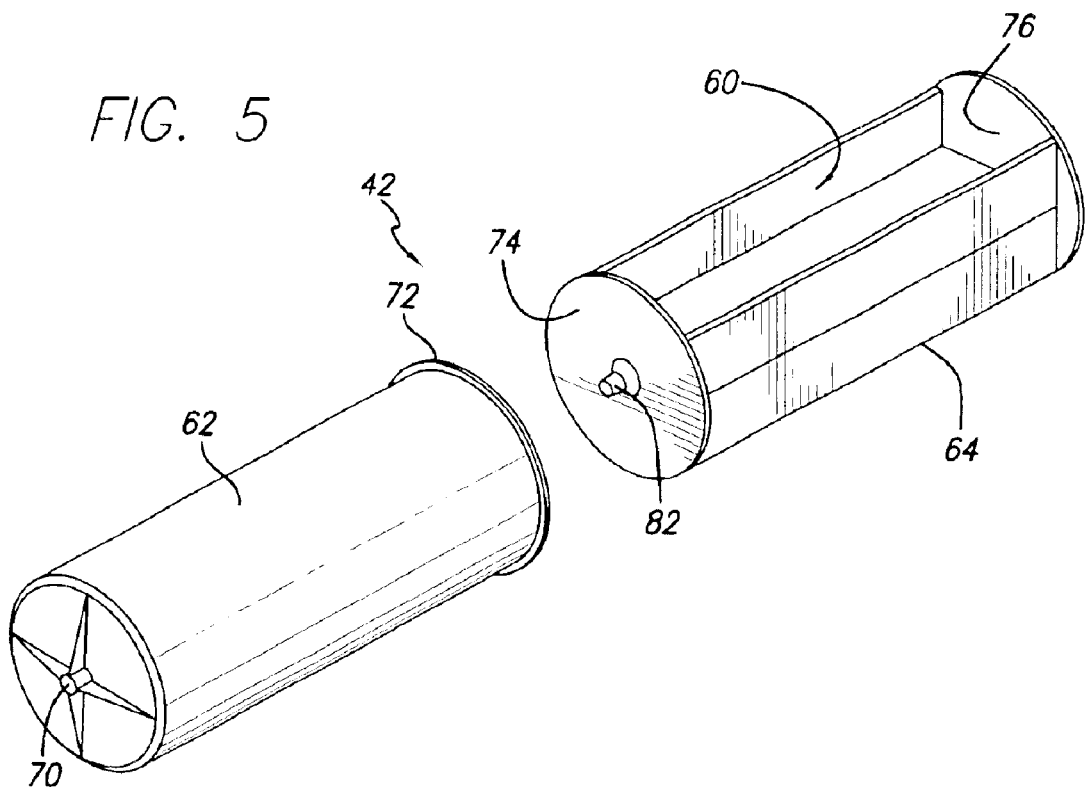
FIG. 5 is a diagrammatic isometric view of a container for holding a discrete amount of build material for use in the embodiment shown in FIG. 4.
Figure 6:
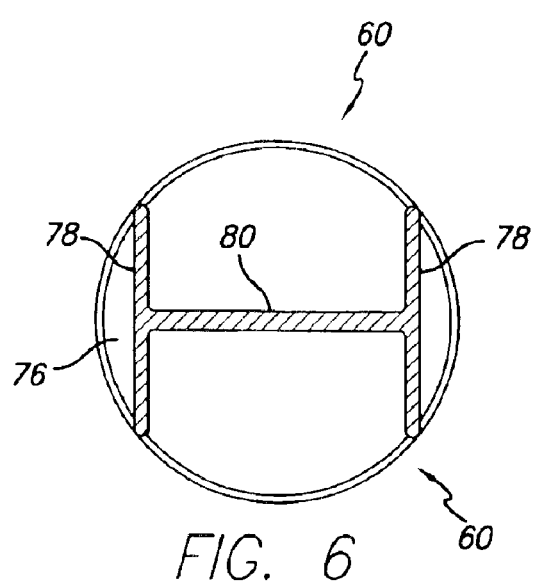
FIG. 6 is a cross-sectional view of the waste receptacle associated with the container shown in FIG. 5.

A preferred embodiment of the containers 42 for use in the feed and waste system are shown in FIGS. 5 and 6. Each container 42 comprises a syringe portion 62 and plunger portion 64. The syringe portion forms a cylinder having a small opening 70 at one end for dispensing the material. A flange 72 is provided on the end opposite the small opening, which acts as a key for loading the containers into the hopper. The plunger portion 64 comprises a piston end 74 which bears against the material in the cylinder of the syringe portion 62. The plunger portion 64 also has a sealing end 76 which, as shown in FIG. 4, when the container is loaded into and held in place by the indexer 44, is acted on by the extrusion bar 46 which drives the plunger portion into the syringe portion. As the plunger portion 64 is driven into the syringe portion 62 the material in the syringe portion is expelled through the small opening 70.

Preferably, all the containers loaded with the build material have an identical flange configuration that can only be received in a magazine that dispenses the build material. All the containers loaded with the support material have a different flange configuration that can only be received in the magazine that dispenses the support material.

A protruding tip 82 is provided on the piston end 74, which expels the last material in the small opening 70. Unique to the container is a waste receptacle 60 that is provided on the plunger portion 64 for accepting delivery of waste material. Preferably there are two symmetrically opposed waste receptacles 60 for each plunger portion 64, as shown in FIG. 6. The symmetrical waste receptacles are defined by a common bottom 80 and two generally parallel side walls 78. The length of the side walls are less than the distance between the side walls so that, as shown in FIG. 4, the magazine 16 can have a keyway 84 sized to only allow the containers to be inserted with the side walls 78 positioned horizontally. The side wall must be positioned horizontally in the magazine so that the indexer 44 can then rotate the containers to the appropriate position with the side walls positioned vertically prior to the container being acted on by the extrusion bar 46. Since the container is symmetrical about the common bottom 80 of the plunger portion, the containers cannot be inserted incorrectly in the magazine.

Referring back to FIG. 4, the extrusion bar acts on the plunger portion 64 to drive the plunger into the syringe portion 62 and thereby remove the build material from the container. As this occurs, the waste material 43 is deposited into the waste receptacle 60 of the plunger portion 64. Once substantially all of the material has been delivered to the dispensing device 14, the waste material is preferably sealed within the container for safe disposal. This is accomplished when the sealing end 76, shown in FIG. 5, engages the cylindrical syringe portion 62 to achieve a substantially air tight fit. Once substantially all of the material has been delivered to the dispensing device and the plunger has been sealed, the indexer barrel then rotates and ejects the sealed cartridge, as shown by numeral 66, into a waste drawer or bin 68. After the sealed cartridge 66 is ejected, the indexer then replaces the ejected container by loading a new container from the queue station.

The embodiment shown in FIG. 4 has many advantages over existing feed systems. For example, since the material is both delivered and ejected in hermetically sealed cartridges, reactive materials may be used by the SFF apparatus in an office environment without requiring special handling procedures. In addition, when the build material is a UV curable material, a UV flash cure lamp, shown by numeral 70, can be used to cure the waste material by exposing the waste material to actinic radiation after the waste material has been dispensed into the waste receptacle 60. This provides an additional level of protection in the event an ejected cartridge is mishandled and unexpectedly damaged to the point that direct contact with the waste material becomes possible.

It is preferred that an SFF apparatus shown in FIG. 7 be provided with two feed systems, of which for the ease of illustration just one is shown in FIG. 4 at numeral 10. One feed system delivers the build material 23A, and the other delivers the support material 23B. As discussed in conjunction with the preferred containers shown in FIG. 6, the support material cartridges are configured such that they can not be inserted into the build material magazine. Likewise, the build material cartridges are configured such that they can not be inserted into the support material magazine. Such special keying of the cartridges and magazines eliminates the possibility of inadvertently mixing the materials in the apparatus. In the preferred embodiment, the waste material comprises portions of both the build material and the support material, which are delivered to the waste receptacle of the support material cartridge and build material cartridge. Preferably the waste material is delivered to the waste receptacle of a cartridge only when the cartridge is expelling material for use by the dispensing device.

In an alternative embodiment the container may comprise flexible tubes or bags instead of a cartridge to deliver the material. In addition, instead of using an extrusion bar to expel the material, a pair of rollers could be used to squeeze the material out at one end of the tube or bag. Waste material could also be delivered back into the tubes or bags on the opposite end of the tube or bag as the rollers advance forward to expel the material, similar to the manner in which a peristaltic pump operates. The tube or bag material could be transparent to actinic radiation in which case the waste material could be cured in the bag or tube by exposure to actinic radiation that passes through the thin walls of the bag or tube. The bags could then be tied or sealed prior to ejecting the waste material.

Now referring to FIG. 8, the SDM apparatus schematically shown in FIG. 7 is shown at 10. To access the build environment, a slideable door 104 is provided at the front of the apparatus. The door 104 does not allow radiation within the machine to escape into the environment. The apparatus is configured such that it will not operate or turn on with the door 104 open. In addition, when the apparatus is in operation the door 104 will not open. A build material feed door 106 is provided so that the build material containers can be inserted into the apparatus. A support material feed door 108 is also provided so that the support material can be inserted into the apparatus. A waste drawer 68 is provided at the bottom end of the apparatus 10 so that the expelled waste containers can be removed from the apparatus. A user interface 110 is provided which is in communication with the external computer 35 previously discussed which tracks receipt of the print command data from the external computer.

What has been described are preferred embodiments in which modifications and changes may be made without departing from the spirit and scope of the accompanying claims.

What is claimed is:

1. A method for dispensing a build material in a flowable state from a dispensing device of a solid freeform fabrication apparatus to form a three-dimensional object, the method comprising the steps of:
   providing at least one build material queue station for holding a plurality of discrete amounts of a plurality of different build materials in a non-flowable state, each build material being associated with a unique physical characteristic;
   providing at least one support material queue station for holding a plurality of discrete amounts of support material in a non-flowable state;
   loading the plurality of discrete amounts of build materials in non-flowable state to the build material queue station, the discrete amounts of build materials residing in the queue station in a random order;
   loading the plurality of discrete amounts of support material in a non-flowable state to the support material queue station;
   delivering the discrete amounts of build materials from the build material queue station to at least one hopper on the dispensing device;
   delivering the discrete amounts of support material from the support material queue station to at least one hopper on the dispensing device;
   changing the build materials and the support material from the non-flowable state to a flowable state after delivery of the build materials and the support material to the hopper;
   moving the build materials in the flowable state in the hopper to build material receptacles of the dispensing device and moving the support material in the flowable state in the hopper to a support material receptacle of the dispensing device; and
   dispensing the build materials in the build material and dispensing the support material in the support material receptacles by the dispensing device in the flowable state in a layerwise fashion to form the three-dimensional object and to form supports for the three-dimensional object.

2. The method of claim 1 further comprising the step of:
   providing an environment for the build material to return to the non-flowable state after being dispensed in the layerwise fashion.

3. The method of claim 1 wherein the step of delivering the discrete amounts of build material occurs in response to a low condition detected in the amount of build material held in the receptacle.

4. The method of claim 1 wherein the step of moving the build material in the flowable state in the hopper to the receptacle is accomplished by capillary action.

5. The method of claim 4 wherein the step of dispensing the build material and the step of dispensing the support material is performed by at least one ink jet print heed.

6. The method of claim 1 further comprising the step of including a color additive in each different build material to establish the plurality of different build materials.

7. The method of claim 6 wherein the color additives are indicative of the colors consisting of cyan, magenta, yellow, and black.

8. The method of claim 1 further comprising the steps of:
   producing waste material from the dispensed build material and support material; and
   depositing the waste material in a waste receptacle associated with a container for removing the waste material.

9. The method of claim 8 further comprising the steps of:
   removing the container when the container has been filled to a desired level; and
   replacing the removed container with another container.

10. The method of claim 9 further comprising the step of:
    curing the waste material in the waste receptacle.

11. The method of claim 10 wherein the waste material is cured by exposing the waste material to actinic radiation.

12. The method of claim 11 further comprising the step of:
    closing the waste receptacle prior to ejecting the container.

13. The material feed system of claim 8 further comprising:
    the means for depositing the waste material also dispenses the waste material in a waste receptacle associated with each container holding support material and each container holding build material.

14. The method of claim 1 further comprising the build material and support material being held in separate containers in the hoppers for dispensing the build material to form the three-dimensional object and for dispensing a support material to form support for the three-dimensional object.

15. The method of claim 14 further comprising the steps of:
    removing the containers when substantially all of the material in each container has been expelled; and
    replacing each removed container with another container holding a discrete amount of material to be delivered to the dispensing device.

16. A build material feed system for a solid freeform fabrication apparatus, the build material having a non-flowable state and a flowable state, the apparatus having a dispensing device for dispensing the build material, the feed system comprising:
    means for holding a plurality of discrete amounts of build material in a non-flowable state;
    means for delivering the discrete amounts of the build material in the non-flowable state to at least one hopper on the dispensing device;
    means for changing the build material from the non-flowable state to the flowable state after delivery of the build material to the hopper;
    means for moving the build material in the flowable state in the hopper to a receptacle of the dispensing device;

means for dispensing the build material in the receptacle by the dispensing device in a layerwise fashion; and computer controller means connected to and cooperative with the build material feed system computer controller means adapted for processing the object data to control the solid freeform apparatus so build material is provided by the build material feed system when forming the three-dimensional object.

17. The build material feed system of claim 16 wherein the means for moving the build material in the hopper to the receptacle comprises a passage in the dispensing device, the passage being in communication between the receptacle and the hopper.

18. The build material feed system of claim 17 wherein the dispensing device has at least one discharge orifice in communication with the receptacle, the discharge orifice having a capillary force, and the passage comprises a capillary valve having an effective capillary force greater than the capillary force of the discharge orifice and the receptacle of the dispensing device is maintained at subatmospheric pressure.

19. The build material feed system of claim 16 wherein the dispensing device comprises at least one ink jet print head having a plurality of discharge orifices.

20. The build material feed system of claim 19 further comprising means for detecting a low condition of build material held in the receptacle for controlling the delivery of the discrete amounts of build material to the hopper.

21. The build material feed system of claim 19 wherein the dispensing device comprises at least two hoppers, at least one hopper adapted for receiving the build material to be dispensed to form the three-dimensional object, and at least another hopper adapted for receiving a support material to be dispensed to form supports for the three-dimensional object.

22. The material feed system of claim 21 further comprising at least one container being retained in a queue station in each hopper.

23. The material feed system of claim 22 further comprising heating means in each hopper to change the build material and the support material to the flowable state.

24. The material feed system of claim 23 further comprising the dispensing device dispensing layers formed from build material and support material to form the three-dimensional object and supports for the three-dimensional object.

25. The material feed system of claim 24 further comprising means for normalizing the layers of the three-dimensional object wherein waste material is produced.

26. The material feed system of claim 25 further comprising means for depositing the waste material an a waste receptacle associated with the container.

27. The material feed system of claim 26 further comprising:

means for ejecting the container for build material and the container for support material when substantially all of the material in each container has been removed.

28. The material feed system of claim 27 further comprising:

means for curing the waste material after the waste material is delivered to the waste receptacle.

29. The material feed system of claim 28 wherein the means for curing the waste material cures the waste material by exposure to actinic radiation.

30. The material feed system of claim 29 further comprising:

means for closing the waste receptacle prior to removing the waste receptacle.

31. The build material feed system of claim 16 further comprising at least two dispensing devices, at least one dispensing device for dispensing the build material forming the three-dimensional object and at least one dispensing device dedicated to dispense a support material to form supports for the three-dimensional object.

32. The build material feed system of claim 16 wherein the dispensing device comprises a plurality of hoppers, each hopper being associated with a different build material having a unique visual characteristic and being delivered the build material indicative of the unique visual characteristic.

33. The build material feed system of claim 32 wherein the unique visual characteristic associated with the hoppers is color, and a color additive is provided in the different build materials delivered to the hoppers.

34. The build material feed system of claim 33 wherein the color additives are indicative of the colors consisting of cyan, magenta, yellow, and black.

35. The build material feed system of claim 34 wherein the dispensing device has a plurality of discharge orifices that can selectively dispense the build material with any color additive to any coordinate in any layer of the three-dimensional object.

36. The build material feed system of claim 16 wherein the means for delivering the discrete amounts of build material to the hopper comprises a mechanical indexer that delivers the material in a drop-in-load manner.

37. A solid freeform fabrication apparatus for forming a three-dimensional object in a layerwise fashion by dispensing a build material in a flowable state, the apparatus comprising:

a build environment having a build platform for supporting the three-dimensional object while it is being formed;

at least one dispensing device adjacent the build platform for dispensing the build material in the flowable state to form layers of the three-dimensional object, the dispensing device having at least one hopper for receiving the build material;

at least one queue station for holding a plurality of discrete amounts of build material in a random order, the material residing in a non-flowable state;

a motion means for moving the dispensing device and the build platform respectively when dispensing the build material;

a means for delivering the discrete amounts of build material from the queue station to the hopper;

a heating means in communication with the hopper for changing the build material from the non-flowable state to the flowable state; and a computer controller for receiving object data descriptive of the three-dimensional object, the computer controller adapted for processing the data in order to control the apparatus when forming the three-dimensional object.

38. The apparatus of claim 37 wherein the dispensing device further comprises:

at least one receptacle for holding a volume of the build material in the flowable state; and wherein the discrete amounts of the build material are delivered to the hopper in response to a low condition detected by the computer controller in the amount of build material held in the receptacle.

39. The apparatus of claim 38 wherein the dispensing device further comprises:

at least one discharge orifice in communication with the receptacle, the discharge orifice having a capillary force;

a passage in communication with the receptacle and the hopper, the passage including a capillary valve having an effective capillary force greater than the capillary force of the discharge orifice, the passage allowing the build material in the hopper that has changed to the flowable state to travel through the passage and into the receptacle; and wherein the volume of build material in the receptacle of the dispensing device is maintained at sub-atmospheric pressure.

40. The apparatus of claim 39 wherein at least one hopper is adapted for receiving the build material to be dispensed to from the three-dimensional object, and at least one other hopper is adapted for receiving a support material to be dispensed to form supports for the three-dimensional object.

41. The apparatus of claim 37 further comprising at least two dispensing devices, at least one dispensing device for dispensing the build material forming the three-dimensional object, and at least one other dispensing device for dispensing a support material to form supports for the three-dimensional object.

42. The apparatus of claim 37 wherein the dispensing device further comprises a plurality of hoppers, each hopper being associated with a different build material having a unique visual characteristic and being delivered build material indicative of the unique visual characteristic.

43. The apparatus of claim 42 wherein the unique visual characteristic of the build material delivered to each hopper is color, and a color additive is provided in the different build materials delivered to the hoppers.

44. The apparatus of claim 43 wherein the color additives are indicative of any one or combination of the colors consisting of cyan, magenta, yellow, and black.

45. The apparatus of claim 44 wherein the dispensing device comprises a plurality of orifices in communication with the hoppers such that all the different build materials can be selectively dispensed to any coordinate in any layer on the three-dimensional object.

46. The solid freeform fabrication apparatus of claim 37 further comprising:

means for normalizing the dispensed layers producing waste material comprising dispensed material.

47. The solid freeform fabrication apparatus of claim 46 further comprising waste removal means to deposit the waste material in a waste receptacle associated with a container holding build material in the queue station and the hopper.

48. The solid freeform fabrication apparatus of claim 47 wherein the dispensing device dispenses a build material to form the three-dimensional object and a support material for forming support for the three-dimensional object.

49. The solid freeform fabrication apparatus of claim 47 having two dispensing devices, one dispensing device dispensing a build material to form the three-dimensional object, and the other dispensing device dispensing a support material to form support for the three-dimensional object.

50. The solid freeform fabrication apparatus of claim 46 further comprising means for ejecting the container when substantially all of the material in the container have been removed.

51. The solid freeform fabrication apparatus of claim 50 further comprising a waste curing means for curing the waste material after the waste material is deposited in the waste receptacle, the waste material being cured by exposure to actinic radiation.

52. The solid freeform fabrication apparatus of claim 51 further comprising a waste closing means for scaling the waste receptacle prior to removing the receptacle.

* * * * *